United States Patent
Angeleri et al.

[11] Patent Number: 5,511,038
[45] Date of Patent: Apr. 23, 1996

[54] PROCESS AND DEVICE FOR DETECTING SEISMIC SIGNALS IN ORDER TO OBTAIN VERTICAL SEISMIC PROFILES DURING BORE DRILLING OPERATIONS

[75] Inventors: Giampiero Angeleri, Garlasco; Sergio Persoglia, Trieste; Flavio Poletto, Gorizia; Fabio Rocca, Milan, all of Italy

[73] Assignees: Agip S.p.A.; Osservatorio Geofisico Sperimentale, both of Milan, Italy

[21] Appl. No.: 191,511

[22] Filed: Feb. 3, 1994

[30] Foreign Application Priority Data

Feb. 5, 1993 [IT] Italy .................................. MI93A0196

[51] Int. Cl.$^6$ .................................................. G01V 1/28
[52] U.S. Cl. .................... 367/40; 367/57; 367/41
[58] Field of Search .................... 367/57, 40, 41, 367/911

[56] References Cited

U.S. PATENT DOCUMENTS

| | | | |
|---|---|---|---|
| 3,860,902 | 1/1975 | Galle . | |
| 4,849,945 | 7/1989 | Widrow | 367/30 |
| 4,862,423 | 8/1989 | Rector | 367/25 |
| 4,926,391 | 5/1990 | Rector et al. | 367/82 |
| 4,954,998 | 9/1990 | Rector | 367/41 |
| 4,964,087 | 10/1990 | Widrow | 367/45 |
| 4,965,774 | 10/1990 | Ng et al. . | |
| 5,012,453 | 4/1991 | Katz | 367/57 |
| 5,050,130 | 9/1991 | Rector et al. | 367/41 |
| 5,109,947 | 5/1992 | Rector, III | 181/106 |
| 5,148,407 | 9/1992 | Haldorsen et al. | 367/32 |
| 5,151,882 | 9/1992 | Kingman | 367/82 |
| 5,191,557 | 3/1993 | Rector et al. | 367/41 |

OTHER PUBLICATIONS

Poletto et al.; "Orthogonalized Noise Subtraction"; May 26–30, 1991, 53rd EAEG Mtg., pp. 566–567.

*Primary Examiner*—Charles T. Jordan
*Assistant Examiner*—Christopher K. Montgomery
*Attorney, Agent, or Firm*—Robert D. Schaffer; Rogers and Wells

[57] ABSTRACT

A process for preparing vertical seismic profiles (VSP) by bore drilling using, as the seismic source, the vibrations generated by the drilling bit. A cross-correlation between the bit signal and the signals collected by seismic geophone lines, is determined in which the bit signal is processed by arranging a plurality of several types of detectors on the bore drilling facility. A plurality of traces are recorded, in which the signal/noise components have different characteristics. These can be separated by means introducing filter functions by operating either on their Fourier Transforms or on the basis of their statistic distribution.

3 Claims, 8 Drawing Sheets

PROCESS AND DEVICE FOR DETECTING SEISMIC SIGNALS IN ORDER TO OBTAIN VERTICAL SEISMIC PROFILES DURING BORE DRILLING OPERATIONS

BACKGROUND OF THE INVENTION

The present invention relates to carrying out a seismic survey in order to obtain data on the characteristics of lithological formations. This is done by bore drilling operations using measurements of the seismic signal as it propagates through the layers.

Such a determination is essentially based on the measurement of the detection times of reflected signals. These correspond to a signal generated by a seismic source. They are constituted by vibrations or elastic energy impulses, after the latter are reflected off of the geological layers at their various levels. In general terms, the determination system is constituted by a seismic source and a plurality of signal receivers for both direct and reflected signals. These are distributed around a well, and by using devices and procedures described herein for processing and interpreting the return signals detected by the receivers.

This detection technique is currently designated by means of its acronym "VSP" (Vertical Seismic Profiling). VSP makes possible a representation to be obtained of the underground adjacent to the drilled bore. This is done by starting from the signal reflections on the layers which constituted it. The position of the various underground layers is reconstructed on the basis of the delay times with which the signal returns to the receivers.

The techniques for the interpretation of the reflected signals have been considerably developed, and, with the aid of computer supported data processing, make it possible that information is obtained on the formations by bore drilling.

The conventional technique for VSP survey requires that the drilling operation be interrupted, and that the drill string and the drilling bit must be extracted from the well bore. One or more detection geophones are then introduced into the already drilled bore and one or more sound impulses are generated at either the surface level, or at a low depth, and in the nearby of the well (for example, by firing explosives charges). The signals are then detected. These signals reach the geophones which are installed inside the interior of the well. Such an operation does not cause uncertainties about the "primary" signal generated at the surface level. The return signals detected do not pose serious interpretation difficulties, but are affected by considerable drawbacks. Firstly, it is a very expensive operation because it requires that the drilling operations are discontinued for a long time interval, therefore, they can only be carried out an extremely small number of times during the course of the bore drilling. The operation of extraction and reinsertion of the drill string is very complex and not free from risks, and therefore requires that particular safety procedures and precautions are adopted.

More recently, it was proposed that such surveys should be carried out by using, as the seismic source, the same signal generated by the drilling bit during the drilling operation.

For example, such survey systems are disclosed in U.S. Pat. No. 4,965,774 to Atlantic Richfield, U.S. Pat. Nos. 4,862,423; 4,954,998 and 4,964,087 to Western Atlas Inc., U.S. Pat. No. 4,718,048 to S.N. Elf Aquitaine and U.S. Pat. No. 5,050,130 to Gas Research Institute.

Using the same drilling bit as the seismic source offers the advantage that surface measurements can be carried out during the bore drilling operations, without interfering with the drilling activities. A large amount of data can be collected with low cost and low risks, with frequent detection campaigns, or even continuously. Unfortunately, the signal generated by the drilling bit has the drawback of being affected by propagation disturbances and of being continuous over time. It is therefore very difficult to establish which is the reliable signal generated by the drilling bit to compare it to the return signals which are detected by the detectors installed on the ground in the area which surrounds the well being drilled.

In FIG. 1, the typical configuration of the characteristic parts of a drilling facility and of the seismic measurement collection system is shown, in which:

1 indicates the structure of the drilling derrick, 2 indicates the drill string, which, at is end, bears the drilling bit, 3 indicates the drilling bit, 4 indicates the rotary table which transmits the revolutionary movement to the drill string 2

5 indicates the electrical motor which actuates the rotary table 4, 6 indicates the mud tank, 7 indicates the delivery pump for the muds which flow along the interior of the drill string 2, down to the drilling bit 3, where they leave the drill string and rise back to the surface by flowing along the well, 8 indicates the well drilled by the drilling bit 3 during its downwards movement inside the underground, inside which the muds delivered with the pump 7 rise back to the surface level, 9 indicates a line of detection sensors 10 which receive both the direct seismic signals and the reflected seismic signals generated by the seismic source represented by the drilling bit, which flow through the ground and are collected and recorded by means of a recorder 11.

The detector lines are usually simply designated as the "seismic line" and are generally positioned at a certain distance from the drilling facility, according to criteria of optimization. This makes possible the seismic data to be acquired from a region with a certain surface area around the drilled bore. Such a seismic line is generally constituted by geophones, in the case when the bore is being drilled on land, or by hydrophones, in the case of off-shore drilling operations.

The return signal which is measured is bound to the signal generated by the drilling bit through a transfer function and generally is affected by noise. This seismic source offers great advantages if one succeeds in locating the bit signals, which are distributed over time and are disturbed by a strong environmental noise, for example, the noise generated by the other machinery pieces operating at the drilling facility and by pumps, and separating said signal from such a noise. In other words, the technical problem which the instant invention aims at solving is of obtaining a high enough signal/noise ratio in order to obtain meaningful information as to the nature and configuration of the lithological formations affected by the drilling work.

The amount of noise which is present in the primary signal causes a decay in detection quality, and the noise component must by removed as completely as possible from such a signal.

The present invention is based on adding the contribution of a large amount of data collected by the detection sensors during a discrete time period, to increase the signal/noise ratio. The length of the time period during which said data can be summed is limited by the fact that, during time, the drilling bit advances with simultaneously sinking. Such a technique finds applicative limits of practicality. For example, drilling softer or less compact layers generates weaker signals and measurements must be extended for longer time periods in order to be meaningful. Unfortunately, in such a case, drilling is faster and limitations must be faced as to the allowed time period length for the measurements, in order not to lose the space resolution, owing to the excessive sinking of the drilling bit during the measurements.

The noise prevents clear sensing of the bit signal and results in only being partially removable by means of the technique of adding the contribution of a large number of measurements repeated during discrete time periods. The result which can be accomplished is a better signal/noise ratio, but which is not yet high enough. The noise can be discriminated on the basis of its characteristics, for example, a certain regularity, or the fact of being characterized by random peaks. The bit signal contains unpredictable components due to the casualness of bit/rock coupling during the drilling operation. It has a self-correlation of pulsed type and can be distinguished from the environmental noise.

SUMMARY OF THE INVENTION

The detection process according to the present invention is based on collecting the return signal or signals, by means of the detectors 10 and by the correlation thereof with a measurement of the signal generated by the bit. After processing it—by collecting and using a plurality of joint measurements of the bit signal obtained from a plurality of detectors, and indicated in the following as "pilot signals". A meaningful measurement is thus made under extremely favorable conditions. These represent a new pilot signal representative of the bit signal.

The correlation operation consists, from a qualitative viewpoint, in shifting two signals to be compared to each other, over time, until they are aligned with strongly similar profiles. If the operation does not yield a useful result, a non-correlation exists between the compared signals. The correlation exists between the compared signals. The self-correlation operation consists in comparing the signal to itself, in order to identify possible echoes or reverberations. The cross-correlation is the operation of correlation between the pilot signal and the signals collected by means of the seismic line.

In this way, the signal constituted by a time sequence of impulses (intensity peaks with positive or negative sign) is identified. It is concentrated into one single impulsed signal for each geophysical event measured. For example, the direct signal emitted by the drilling bit is followed by its reflected signals. This signal is generally constituted by a plurality of impulses with well identified relative amplitude and time coordinate.

It must be also taken into account that the pilot signal in practice is not an ideal signal, because the pilot signal has its own delay due to the signal propagation from the drilling bit to the detector which measures it. Inasmuch as the correlation time is a relative delay between two signals, to obtain the absolute delay of the geophysical data measured on the field, the delay already contained in the pilot signal must be compensated. The pilot signal is not the only sequence of impulses generated by the drilling bit, but also contains its repetitions due to reverberation phenomena. For example, inside the interior of the drilling facility, which has its own characteristics of elastic vibration; each signal collected by the detectors must be de-reverberated during the processing step. This is so that one can reconstruct a meaningful signal generated by the drilling bit.

Each measurement which is used for the determination of the pilot signal contains environmental and spurious noises overlapping the drilling bit signal. Therefore, the detected signals must be processed to reduce the presence of such a noise and to reinforce the signal.

Based upon the technical problem discussed above and on the general lines of the technique of seismic detection using the drilling bit as the seismic source, the detection system according to the present invention will be disclosed as regards its typical constituents referring to the schematic of FIG. 1 which illustrates a typical embodiment thereof for illustrative, non-limitative purposes.

U.S. Pat. No. 4,954,998 cited above, proposes a solution of active subtraction of the noise from the pilot signal. Noise is collected with a different detector installed on the same drill string. This detector is regarded as being substantially non-responsive to the drilling bit signal, by selecting the frequency band of such a noise, amplifying it, and then subtracting it from the pilot signal.

Unfortunately, such a technical solution does not seem to be really satisfactory, because it does not take into consideration the simultaneous presence of a plurality of signal and noise traces coming from different sources. The technique proposed by this prior document results in an orthogonalization technique based on separately measuring the noise present in the pilot signal. This does not realize the statistical independence. In fact, this signal, in order to be subtracted without distortion from the output signal, should not contain any residues of drilling bit signal. This would be a condition which could not be realized in industrial practice.

The present invention comprises in preparing the pilot signal. It is then correlated with the signals collected by the seismic detectors 10. In the processes disclosed in the prior art, the detectors for detecting the pilot signal generated by the drilling bit are typically installed on the drill string.

The selection of the sensors results is important when a single pilot detector is used. By this means, it is important that a drilling bit signal is identified which is not only strong (in the sense that its meaningful peaks have meaningful amplitudes), but above all, is of good-quality (in the sense that such meaningful peaks are not affected by noises which may render them difficult to be identified).

By means of the process according to the present invention, which combines a plurality of signals to decompose them by separating the contributions from the different physical phenomena, the operator can use strong signals without having to limit himself to noise-free signals because these may be unavailable.

The process according to the present invention makes it possible that signals are advantageously used by having the noises and the drilling bit signals display power spectra which may be comparable. This is provided that the signals and the noises are characterized—as it in reality occurs—by statistical behaviors determined by different laws and in different proportions to the measurements carried out.

DESCRIPTION OF THE PREFERRED EMBODIMENT

Figure 1:
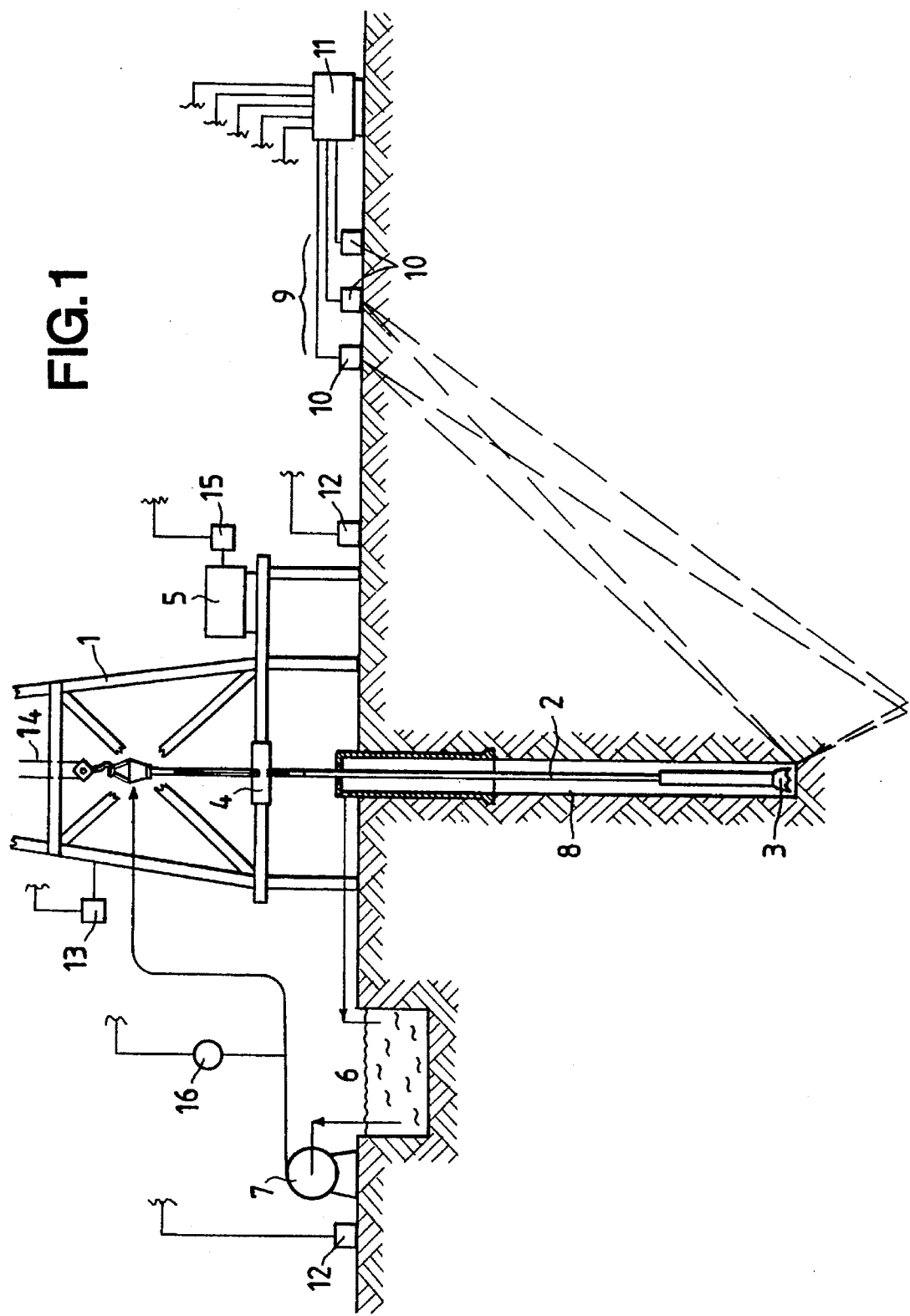
FIG. 1 is a side view of a typical configuration of the present invention.

According to the present invention, the pilot signal is obtained and processed on the basis of detecting a plurality of pilot detectors of different types, as indicated in the following:

(a) vibration detectors 13 installed on the derrick structure 1, for example, geophones, accelerometers or monoaxial or triaxial detectors. These supply information on the environmental noise and on the impulses generated by the movement of the drilling bit, to detect the signal transmitted to the derrick through the drill string, through the derrick-string coupling by means of the support cables 14. In fact, it was found that it is not necessary to install the detectors directly on the drill string. That would be difficult and uncomfortable to install and manage due to the continuous interventions on the drill string by the operators;

(b) current intensity detectors 15, for example, an ammeter, to measure the instantaneous absorption of electrical current by the motor 5 of the rotary table 4. The twisting stresses applied to the components of the drill string are transmitted to the same string to the rotary table which is connected with the motor. Such detectors supply a variable dimension of a different type from the dimension measured by the vibration detectors 13, with which it is strictly correlated;

(c) pressure detectors 16 installed in the mud loop, for example, in the pump 7 delivery duct. The vibration induced by the bit 3 bumps during the drilling step and propagates through the muds and reaches the surface level. The propagation through the mud causes a time offset between the arrival of the impulses and the arrival of the same impulses through the string steel. It is less sensible to the reverberation phenomena which, on the contrary, take place to a considerable extent compared to the propagation through the metal;

(d) geophones 12, or equivalent vibration detectors, installed on the same yard as of the drilling string. These are suitable for detecting from ground, with a different amplitude, both the noises generated by the drilling machinery and the useful signal coming from the drilling bit.

Each of these different types of detectors used in combination with one another detects a signal propagated through a different transmission means: the steel of the string, the electrical connection of the motor, the drilling mud and the ground through which the drilling is carded out. Each of these has a different influence on the signal/noise ratio.

Each of these detectors used in combination with one another supplies a signal, or, better, a trace. The trace has a time offset relative to the other detectors. In such traces, the signal/noise components assume different weights. Thus, such components can be separated from one another to obtain a meaningful signal generated by the drilling bit, to be used for cross-correlation.

Each detector supplies a sequence of measured values, expressed in either digital or analog values, currently referred to as the "trace".

Each trace is constituted by a set of measured values expressed as digital or analog values, characterized by two essential data, an intensity value and a time coordinate value, which may become an ordinal number of the measurement during the course of the determination.

The intensity value according to the present invention, can be expressed, according to the detectors taken into consideration, as a particle speed due to the effect of the elastic waves due to sound propagation (as measured by geophones), as a pressure (as measured by the pressure gauges installed on the mud delivery duct), and as an accelation (as measured by the accelerometers) or, finally, as the electrical current absorbed by the electrical motor (as measured by an ammeter). Another measurable parameter can be strain, which can be measured by using precision strain gauges.

The traces obtained from the above cited detectors result in being coherent with each other and make possible determining the peaks by the drilling bit impulses to be identified by correlation.

According to a preferred embodiment, the data detecting and recording are carried out with digital values. The measured values are then combined with each other to prepare a very meaningful pilot signal, to be used for its correlation with the signals detected by means of the seismic line. The combination methods used to generate this pilot signal may be more or less sophisticated.

The pilot signals are time-aligned, or simply rearranged. The measurement scanning times may supply the time correspondence, based on the order of the measurements or they can be filtered, so as to be made similar to a reference signal with a known delay. This may be one from the above listed pilot signals.

For example, the reference trace can be obtained from the detector 13 because the length of the drilling string and the sound speed in steel are known. Therefore a reliable value of the true delay between a drilling bit bump and the arrival to the detector 13 of the impulse which corresponds to it, can be obtained.

As already illustrated hereinabove, the sensors 12, 13, 15, and 16 . . . for monitoring the signals producing the pilot signal receive the N traces $P_j(w)$, wherein j=1 . . . N. These traces are used as transforms inside their frequency domain (w indicates frequency).

The expression "transform inside the frequency domain" means the decomposition of the signal into the elementary sinusoidal oscillations which are present in it, each of them with its own phase and amplitude.

To describe each component, two real numbers are necessary, and therefore complex numbers are used (reference is made to Prodi G. "Analisi Matematica", 1976, pages 91/97). The transform is well known with the name of "Fourier transform" (see Bracewell R. "The Fourier transform and its applications", 1985).

The frequency domain constitutes a very useful domain for the determination of signals due to the simplicity of the operation of correlation between the two signals. This operation simply consists in calculating the product, frequency by frequency, of the first signal multiplied by the conjugated complex (indicated with the symbol "*") of the second signal.

The filtering operation is carried out by simply multiplying, frequency by frequency, the filter spectrum by the spectrum of the signal to be filtered.

With this necessary explicative foreword, the trace $P_j(w)$ of the detector 13 is then estimated on the basis of the values of $P_2(w)$ . . . $P_N(w)$, by suing the following method.

After having aligned—on an approximate basis—the pilot signals as a function of time, the new values $$\hat{P}_j(w) = \frac{\overline{P_j^*(w)P_1(w)}}{[p_j(w)]^2 + e} P_j(w) \quad j=2,\ldots N \quad (1)$$

are calculated.

The horizontal line indicates a frequency average and e indicates a blank noise, i.e., a constant frequency value which is added to the term which expresses the average power spectrum $|P_j(w)^2|$ to render the inversion stable. This a rather small value for not meaningfully altering the signal spectrum, but large enough to prevent in the regions (in frequence) of signal absence, denominator values close to 0 that may produce values of the fraction in equation (1) which are excessively large. The fraction of the expression (1) represents the filter which adapts the signal $P_j(w)$ to the signal $P_1(w)$ yielding the estimated value $P_j(w)$.

Each of the values $\hat{P}_j(w)$, j=2, ... N constitutes a new processed pilot signal which reproduces the correlated portion present in $P_1(w)$, i.e., the signal shared with the other signals collected with the other sensors, present in $P_1(w)$.

A simple combination method consists in computing the summation of values $\hat{P}_j(w)$, j=2, ... N, and using this value as the pilot signal. This data must be corrected with the delay of $P_1(w)$, and results that are better than one resulting from $P_1$ alone, and better than those supplied by other sensors alone when the correlated noise present in $P_1$ is negligible.

The determined value strengthens the correlated portion between the pilot sensors. If the correlated noise between the signals from the pilot sensors is negligible, the estimate of filters is effective and the residual noise is removed from the summation operation. If, on the contrary, the correlated noise between the pilot signals is not negligible, there is a distortion of the filters which bind the signals coming from the drilling bit between the different pilot sensors. In that case, the residual subtraction of the noises can be carried out by the processing procedure which is disclosed hereinafter. This makes possible the procedure to be carried out also with signals affected by a considerable noise. In fact, this process makes possible that the pilot signals are combined, so that the signal/noise ratio is increased in the estimate of a good-quality representative signal, to extract, even from considerably noisy signals, the meaningful drilling bit signal, and to remove the noise present.

The process comprises decomposing the pilot signals into the contributions from the several physical phenomena which sum up in the measurements collected with the sensors. The different pilot signals are combined with one another, taking into account that the phenomena which generate the signal (intensity peaks—of either mechanical or sound vibrations, of pressure or of absorbed current—from the drilling bit, side impacts of the components of the drill string, yard noise and so forth) are characterized by different statistical distributions.

The purpose of the process is of preparing, by starting from the signals measured by the pilot sensors, the impacts coming from the drilling bit, both from the noise generated from steady-state operation of the machinery of the workings, as well as from the side impacts of the drill string along the well and from the other noises deriving from the drilling operation, but not from drilling bit impulses. In order to obtain this separation, different methods may be followed; for example, one might verify the independence of the reconstructed processes, or verify that the reconstructed processes have statistical characteristics congruent with those hypothesized a priori.

In both cases, the operation is carried out by aligning the pilot signals with each other, to compare deconvoluted corresponding events. "Deconvoluting" means an operation of reverse filtering as is currently understood, which effectively removes the reverberations and the "multiples" of the drilling bit signal. This is to remove the reverberations present in them, and possibly filtered, to render the impulse responses from the individual channels similar to one another.

If an instantaneous event generates a signal which is measured in a channel, it produces not precisely an impulse, but a signal with a wave shape. It is generally very short during time, which depends on a plurality of factors, e.g., the characteristics of the sensor, the dimension which is being measured, the coupling between the sensor and the medium to which it is applied, etc. Therefore, filtering operators can be created which compensate for these differences by starting both from the knowledge of the characteristics of the instruments, and from direct measurements, as the estimate of the filters for manual adaptation of signals from different sensors. This was disclosed hereinabove.

The separation operation according to both the processes of independence verification and of congruence request is disclosed, for the sake of simplicity, by referring to two pilot signals $P_1$ and $P_2$ $$P_1 = aS + bN$$

$$P_2 = cS + dN \quad (2)$$

constituted by the overlapping of signal s and of noise N with the weighs a, b, c, d.

The independence verification processes takes advantage that the signal and noise are not only perpendicular to each other, but are also statistically independent. To be clearer, and to better describe the use of the techniques of statistical processing of the signals by the present invention, the meaning of perpendicularity and statistical independence of signals are stated in greater detail in the following.

The variables x and y indicate two random variables, commonly indicated as "stochastic", i.e., they show a behavior characterized by a probability distribution (reference is made here to Papoulis A. "Probability, random variables and stochastic processes", 2nd Edition, 1984).

The condition of statistical independence implies that $$E[f(x)g(y)] = E[f(x)]E[g(y)] \quad (3)$$

wherein f( ) and g( ) are two functions of a whatever kind and E indicates the expectation value (see Papoulis).

For a set of M samples, the expectation value E is expressed with good approximation by the expression $$E[\ ] = 1/m \sum_{i=1}^{M} x_i \quad (4)$$

whilst the condition expressed in equation (3) implies in correlation between x and y, i.e.:

$$E[xy] = E[x]E[y] \quad (5)$$

The application to the processing of the seismic data according to the present invention assumes particular meanings. In reality there is a non-limitative condition that the data are with zero average $$E[x] = E[y] = 0 \quad (6)$$

and the same holds true also for their odd powers $$E[x^{(2n+1)}] = E[y^{(2n+1)}] = 0 \quad n = 0, 1, 2 \ldots \quad (7)$$

From expressions (5) and (6), it follows that x and y are perpendicular to each other, i.e.:

$$E[xy]=E[x]E[y]0 \quad (8)$$

Analogously, equations (3) and (7) ensure that the mutual momenta expressed by the first term of equation (3) are zero for odd powers of higher order than the first order of the random variables x and y.

With these explanatory premises, by applying this type of processing to the pilot signals, the procedure is as follows.

In the simple case of two pilot signals, $P_1$ and $P_2$ with combined suitable coefficients (or weights), to obtain combinations x and y, by means of the equation (8), it is verified whether the reconstructed signals defined by such combinations are incorrelated with each other, and furthermore whether the statistical independence is verified. Such verifications make it possible to locate a point in space (x,y). This yields the solution of the sought problem. The extension to a plurality of signals is carried out by increasing the size of the space of combinations and the number of verifications of perpendicularity and independence.

This point identifies the weight functions with which the pilot signals must be combined, to substantially reach the statistical independence and not only to obtain incorrelation of different combinations, as it is described in the prior art. In other words, by means of the process according to the present invention, the signal from the drilling bit is focused and is distinguished by decomposing the pilot sensor signals into statistically independent events.

According to a different embodiment of the present invention, a further verification method comprises separating the overlapped processes into several pilot signals according to expressions (2), verifying that the reconstructed processes have statistical characteristics congruent with those a priori hypothesizable on the basis of the physical nature of the phenomenon, by using the n-th momenta of x and y variables, which, for the variable x, can be expressed as $$m_n=E[X^n]x=1 \ldots n \quad (9)$$

In fact, by using the statistical hypotheses, the conditions can be introduced which relate not only to the first momenta (average values) or second momenta (statistical definition of correlation), but also to higher-order momenta.

Such a further verification method makes resort to "kurtosis" (see Walden A. T., 1985, Non-Gaussian reflectivity, entropy and deconvolution: Geophysics, vol. 50, No. 12, pages 2862–2888) which is calculated as the fourth momentum divided by the square of the second momentum of the variable. The combinations of the obtained signals which verify such conditions are the solution sought.

For explanatory purposes, consider a case when both the drilling bit signal and the noise, overlapped in the signals according to expressions (2), have impulse self-correlation and are incorrelated to each other. They originate an impulse peak both in self-correlations and in cross-correlations of the signals (2). Therefore it is not possible to learn to which extent the one and the other of them contribute to such signals.

If the noise and the drilling bit signal do not have the same statistics and one of them, for example the first one, is characterized by isolated impulse signals (as may happen for the side impacts of the drill string), kurtosis has proved to be an estimate means sensible to the higher order statistics and is a good indicator of the presence of isolated peaks (kurtosis>3). The more increasing, the more isolated the peaks are. This behaviour makes it possible that maximal (or minimal) kurtosis conditions can be imposed for the combinations of signals (2) with suitable coefficients, or, more generally, for some functions of said combinations. The combination, and, consequently, the weight functions which identify it, comply with such a maximum or minimum condition. This is the solution sought for, because it completely separates the higher-kurtosis process (for example, the noise characterized by isolated peaks) from the lower-kurtosis processes (for example, the more uniform signal emitted by the drilling bit). The same separation method holds true in the opposite case, when the noise has higher uniformity characteristics than the drilling bit signal. In this case, the higher-kurtosis process is the drilling bit signal process. Also, this verification method makes possible a good drilling bit signal to be reconstructed.

The pilot signal processed with the methods disclosed heretofore is then used in the cross-correlation between the pilot signal (which represents the primary signal) and the signals collected by the geophones 10 of the seismic line 9.

The result obtained by the processing procedures disclosed thus far, is a good quality seismic signal representative of the impulses of the drilling bit and separated from its noise components.

EXAMPLES

The process according to the present invention was tested on the field at the drilling facility Casanova Staffora 1 of Agip S.p.A., in the territory of the municipality of S. Margherita Staffora (PV), with the following modalities.

The recordings were carried out by signal groups, each 24 seconds long, for a total time of approximately 500 seconds per each group (20–21 recordings). The recordings were started after each 2 meters of advancement of the drilling bit.

Figure 2:
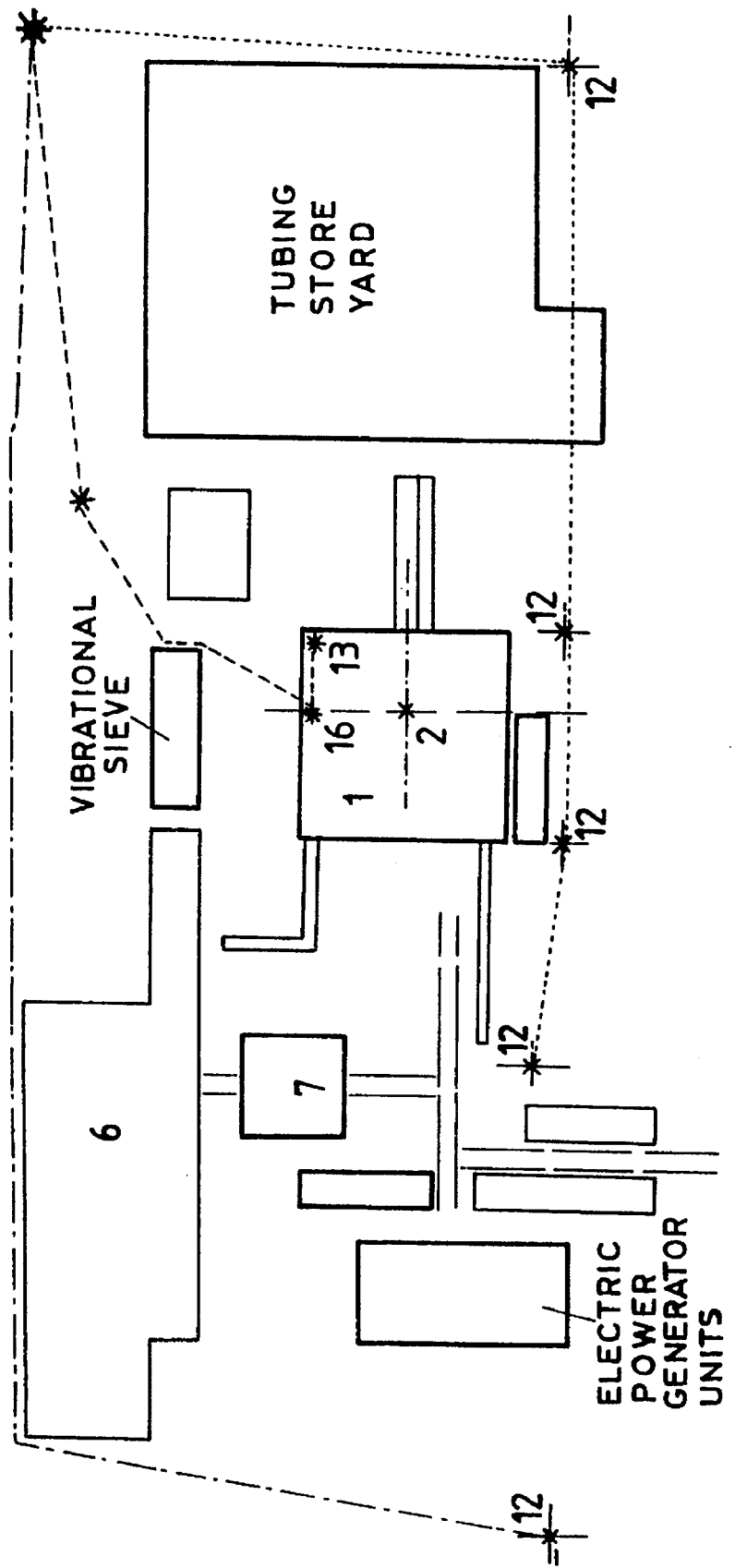
FIG. 2 is a diagrammatic illustration of the apparatus of the present invention.
Figure 3:
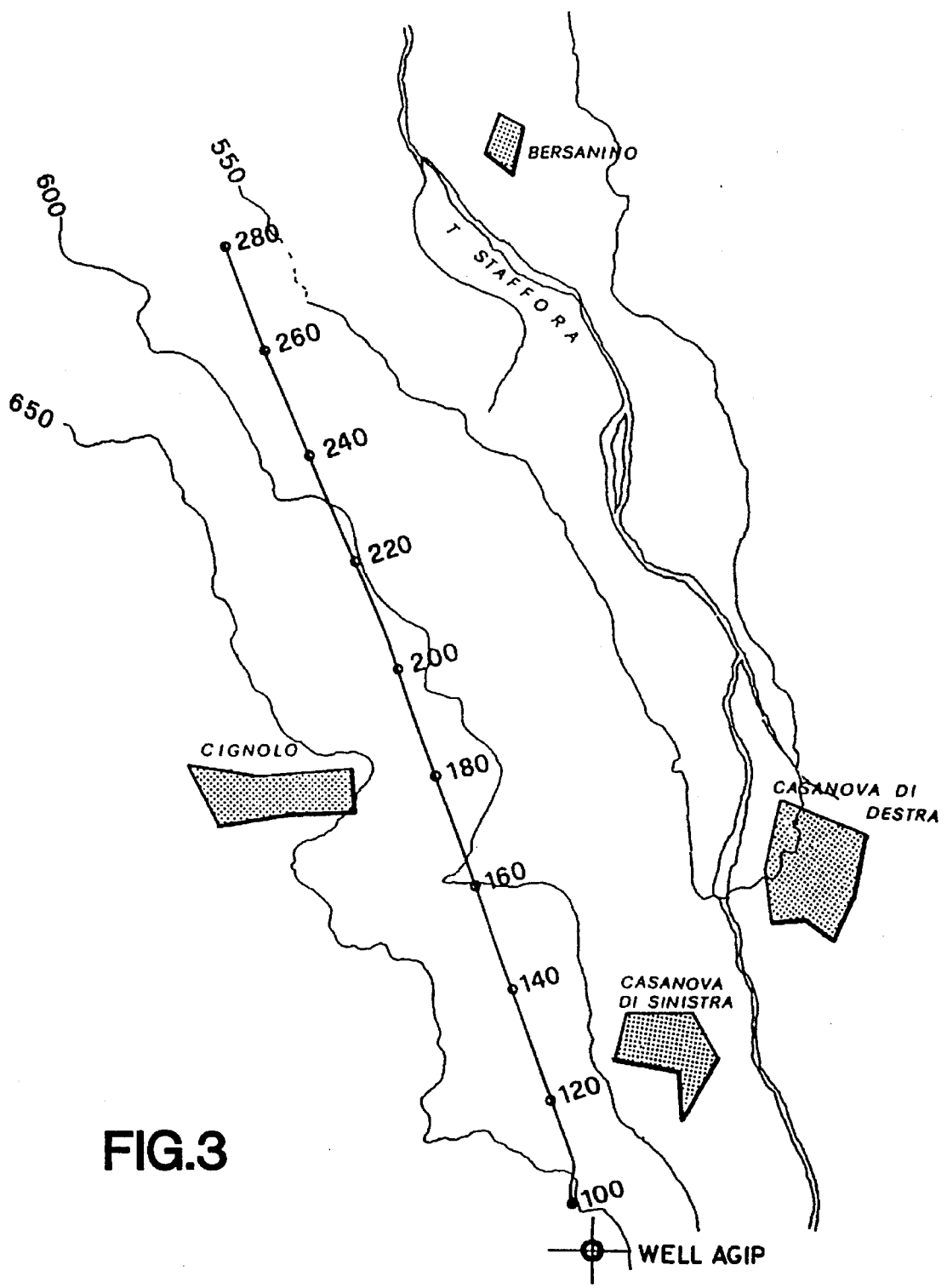
FIG. 3 is a configuration of a seismic line of the present invention.

The top view of the drilling yard and the positions of the various instruments and connections is reported in FIG. 2, and the configuration of the seismic line is indicated in the map of FIG. 3. Such a layout scheme was selected in order to identify and discriminate the noises generated by the external environmental noise sources, or "spurious noise", i.e., the noise capable of summing up and masking the noise generated by the drilling bit. In particular, the recording line was placed in that zone and was regarded as being as the most "noiseless" as regards the spurious noises, such as road traffic or other noises due to human activities in the region, and according to a layout with contained level differences and with the following parameters:

intertrace, i.e., distance between two adjacent listening points, 20 meters;

10 Hz geophones;

each listening point of the recording line, or seismic line, is constituted by 12 equispaced geophones (vertical component Z), the signals of which are summed up.

The signal detection instruments installed on the drilling facility are:

differential pressure gauge 16, located on a branch of the delivery duct, ammeter, installed on the power supply system which feeds the motor which actuates the rotary table;

geophone 13 (vertical component Z) rigidly keyed to the drilling derrick latticework.

The listening points on the yard were constituted by geophones 12, some of them with vertical component (Z), other with three components (X,Y,Z) installed in the nearby of the mud pumps and power generator units.

The technical characteristics and specifications of the instruments of the data acquisition system used in the tests are as follows:

| Recorder: | |
| --- | --- |
| Sercel type | SN-348 |
| Number of channels | 120 |
| Control system | IFP |
| Control dynamics | 84 db |
| Data format | GRC 6250 BPI SEG B |
| Number of traces | 9 |
| Geophones: | |
| Type | Sensor SM4 |
| Natural frequency | 10 Hz |
| Resistance | 70 Ohm |
| Number per string | 12 |
| Pressure gauge: | |
| Manufacturer | PCB Piezoelectronics Inc. |
| Model | H 112A |
| S/N | 6720 |
| Range | 0–3000 psi |
| Maximal pressure | 10000 psi |
| Resolution | 0,004 psi |
| Sensibility | 1.26 p/psi |
| Linearity | 1% FS |
| Natural frequency | 300 kHz |
| Size: - diameter | 1,23 inches |
| - length | 0,25 inches |
| Weight | 5 g |

In the instant case, the ammeter is applied to the electrical motor power supply cable and generates a voltage signal comprising the range of 0–100 mVolt. Such a signal is then amplified to a range of 0–10 Volt and then is transmitted to a measurement system which converts it into kilogrammeters. Such values are both displayed in real time on the yard operating control monitors and are recorded in the storage of the yard computer, after the signal being previously converted from analog into digital with a peripheral unit.

The recording line was designed on the ground with stations being provided at regular distances of 10 meters with a group of geophones installed at each second station (i.e., at the stations with even progressive numbers), and by starting from the station 100 to the station 220 of FIG. 3. The recording line started at a distance of 100 meters from the well and continued in a North-West direction for 1200 meters.

The data collecting operations lasted approximately three months. 6633 recordings of 24 seconds long signals were carried out. The signals were collected in groups, at intervals not always exactly regular, at the rate of 2 meters of sinking of the drilling bit, from level −743 m to level −1837 m.

The collected data was then processed by means of the previously disclosed techniques of numerical processing, to recognize the direct arrival of the signal generated by the drilling bit, to verify their "nature", and also in relation to the physical characteristics of the drilling facility.

Besides the direct arrivals, other components were identified which may be reconducted to reflected events under the drilling bit, and by which the relevant VSP section was carried out.

The results reported in the following examples were obtained by processing single records of 24 seconds of length, with a sampling frequency of 4 milliseconds. As regards the values reported in the independentization charts of FIGS. 4, 6, and 7, on the abscissa, the angle is indicated (as sexasegimal degrees). The pilot traces taken into consideration are combined, it being understood, by this expression, that the first pilot trace is multiplied by the cosine of said angle and the second one is multiplied by the cosine of said angle, and the second one is multiplied by the sine of said angle. The resulting values are added to each other to obtain the combination.

In order to verify independence, two combinations (when two pilot signals are taken into consideration) must be available, according to the equations presented above.

These are obtained as follows: for each combination, the other combination is determined which best verifies the perpendicularity condition. For such pairs, the higher momentums are then checked, with the reported charts being obtained.

On the ordinate, on the contrary, the amplitude relevant to the maximal value of the monitored dimension is reported. The central line represents the zero axis, and the values in the upper portion of the chart are positive values. The dimension determined in this case is the relative deviation of formula (3) for even powers of x and y. In other words, the dimension determined is the difference between the first and the second members of the equation (3), divided by the first member of the same equation, for the even momentums of the combination pairs as cited hereinabove. Whenever this relative difference disclosed is zero, the independence condition (3) is verified.

As regards the dimensions reported in the correlation charts of FIGS. 4, 5, 6, and 8, the time range on the ordinate t(s) represents the correlation time. The zero value of which should be considered at 2.0 seconds in the range of the Figure. In other words, time 0.0 represents the correlation time −2.0, time 4.0 represents the correlation time 2.0, and so forth.

Figure 4A:
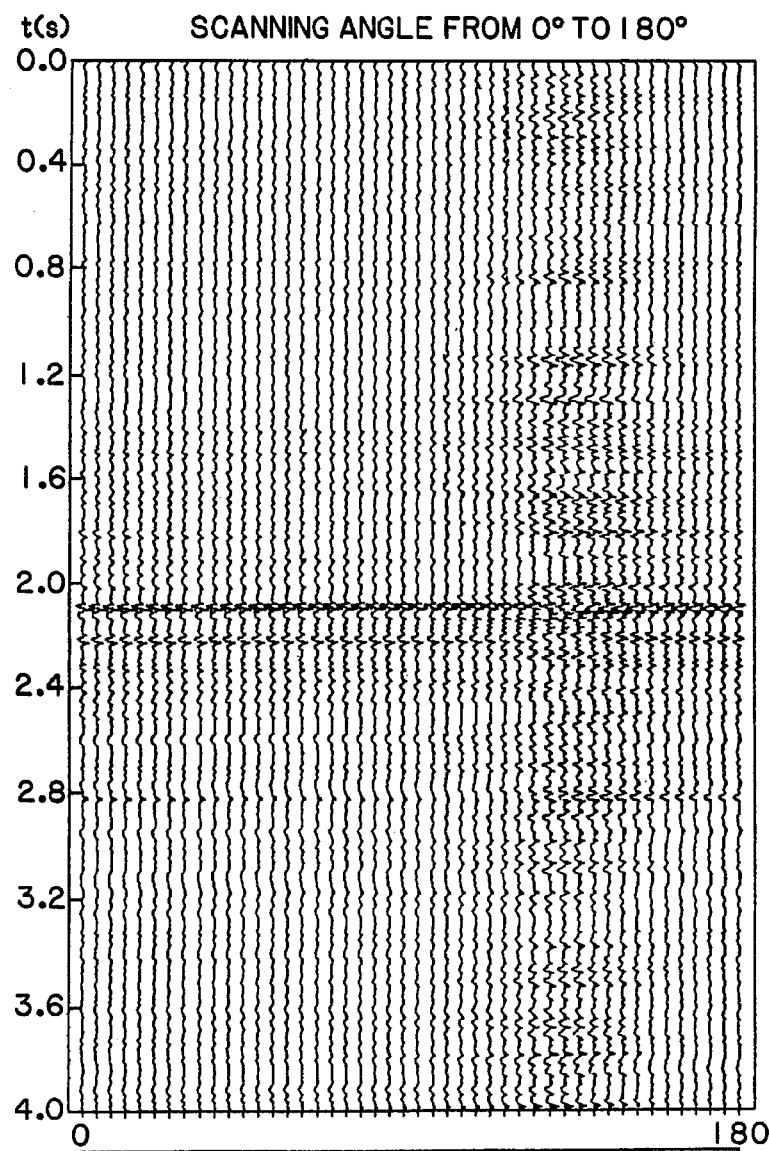
FIG. 4a, 5a, 5b, 6a, and 8a–8c are correlation charts of seismic traces.
Figure 4B:
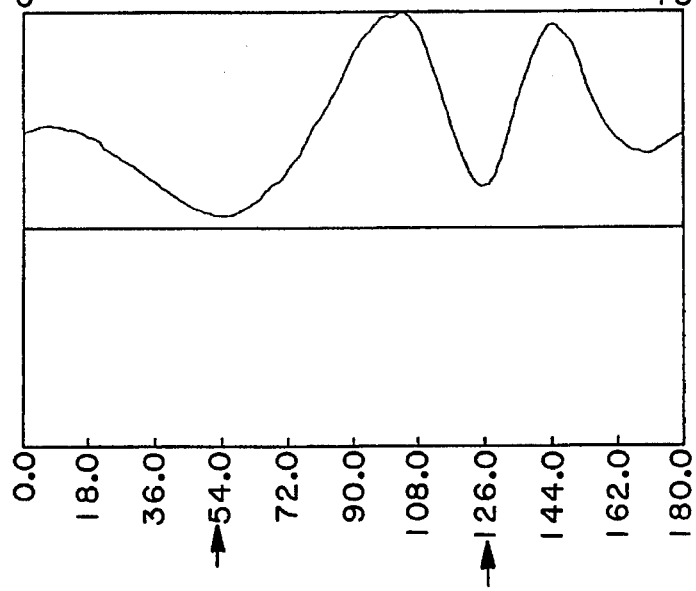
FIG. 4b, 6b, and 7 are independentization charts.
Figure 6A:
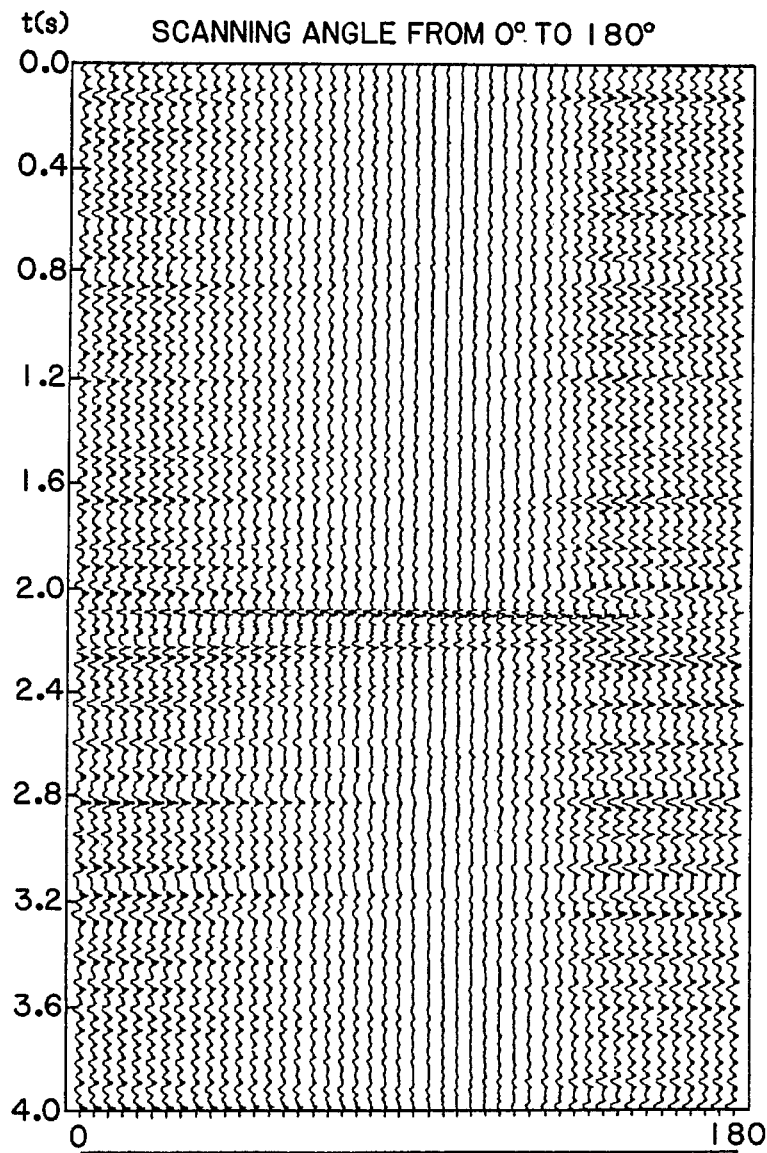
Figure 6B:
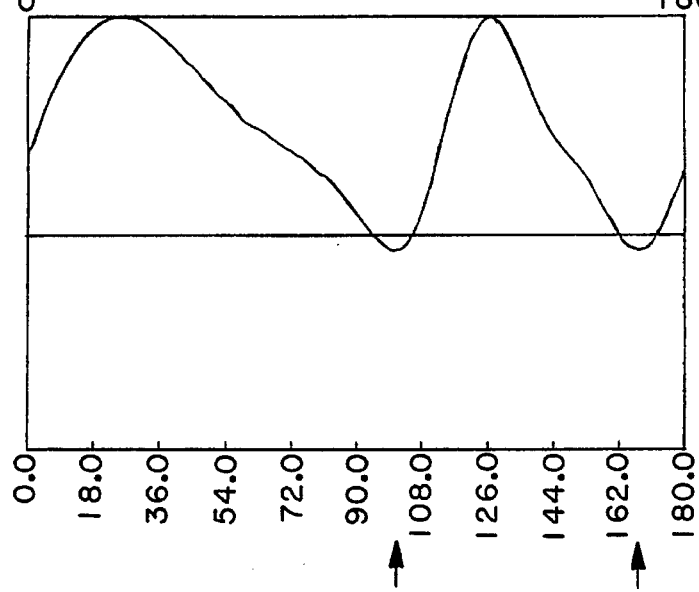

The correlations of the charts of FIGS. 4 and 6 (upper portions) represent the correlations repeated for different combinations of the pilot signals having the same trace of the seismic line. In this case, the horizontal coordinate is the same angle of the independence chart (bottom portion).

Figure 5A:
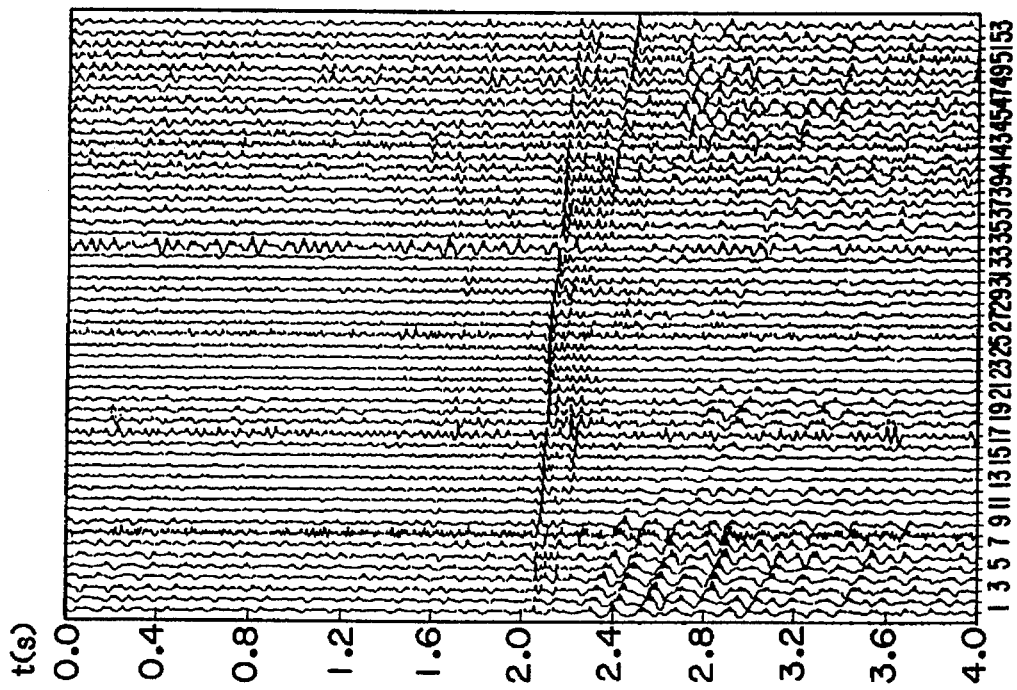
Figure 5B:
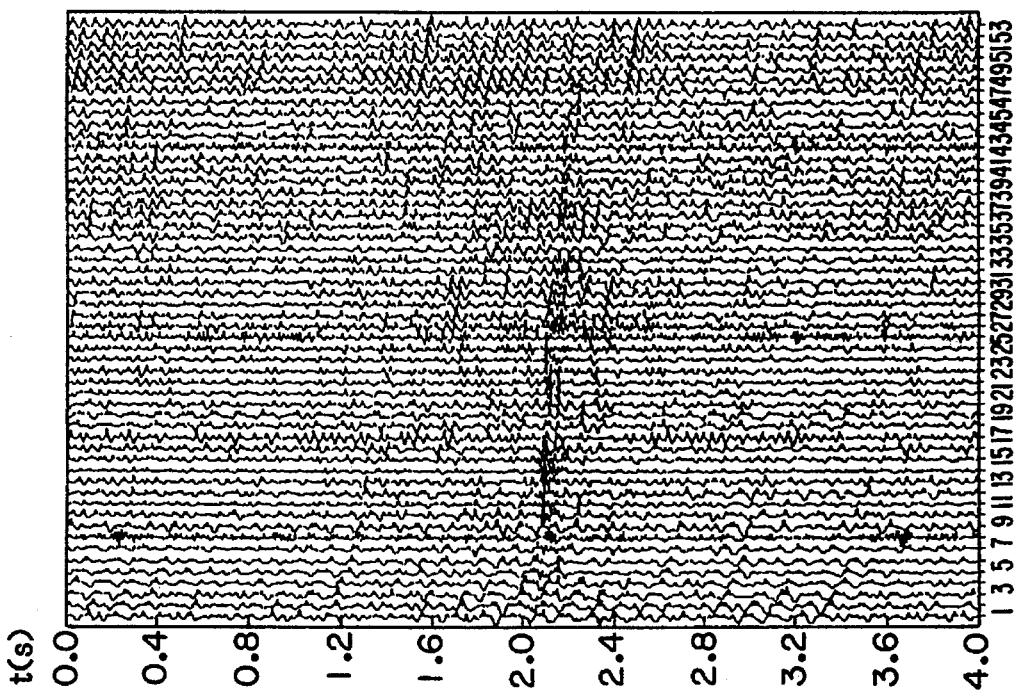
Figures 8A, 8B, 8C:
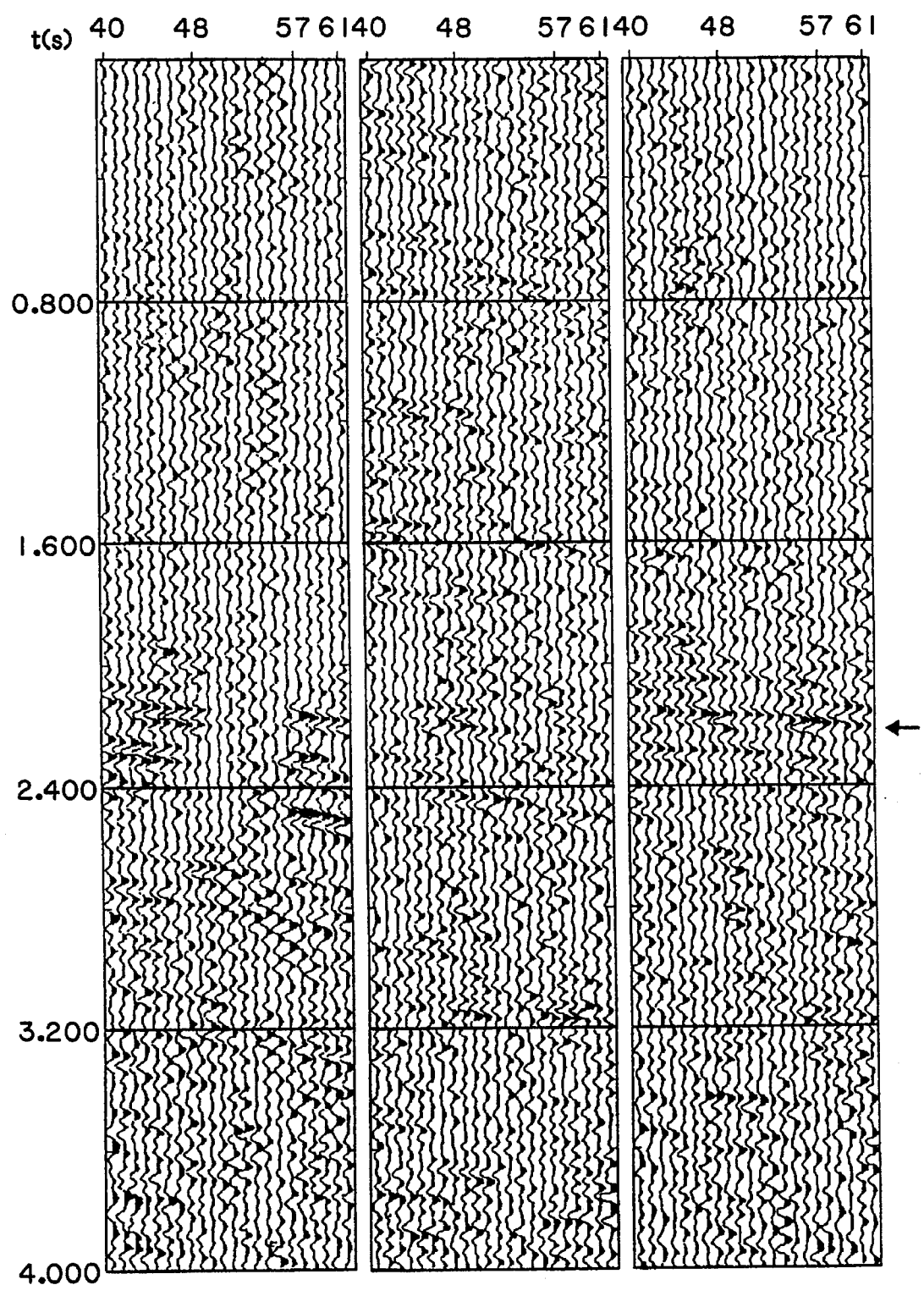

In the charts of FIGS. 5 and 8, the signal along the seismic line is observed. The horizontal coordinate of such figures represent the distance from the well, which varies within indicated intervals for the preselected line traces.

A general observation regarding the above examples demonstrate that the independence verification charts, by mirroring the behaviour of the verification correlations, make possible the complete trend and the separation points between processes of different nature to be clearly located, by observing the contribution of such processes in the verification correlations. In particular, for the indicated values, a clear impulse signal can be observed which corresponds to the direct arrival of the signal from the drilling bit. This arrives soon after two seconds (in the range of the figure). Furthermore, also the separation of noise for the corresponding combination values is clearly apparent. Such points are identified by arrows provided in the low portion of the figures.

It should be stated in detail that the operation of de-convolution in the following examples refers to the so called "spike" de-convolution: operator length 2 seconds and 0.5% of blank noise added (see O. Yilmaz, "Seismic Data Processing, 1987, Society of Exploration Geophysicists, pages 100, 101, 103, 114, and 116).

Example 1

The pilot signals used are the traces supplied by the pressure gauge installed in the mud system and of the sensor-geophone installed on the derrick. The measurements were carried out while the drilling bit was drilling at the depth of 864 meters (as referred to the rotary table).

The following process steps were carried out:

1. the derrick signal is de-convoluted;
2. such a signal is estimated by using the pressure gauge signal according to the expression (1);
3. both of the processed signals are then combined with each other with relative weights, and indicated by means of rotations of from 0° to 180° according to as exposed hereinabove, to determine (x,y) combination pairs perpendicular to each other;

4. the statistical independence is then checked with the expressions (3) of the individual combination pairs, using the following algorithm:

$$\frac{E[x^4y^2] - E[x^4]E[y^2]}{E[X^4Y^2]}$$

In the charts of FIG. 4, the bottom portion represents the verification of the condition of statistical independence. The first point indicated by the left-hand side arrow (abscissa of approximately 52°) and the second point indicated by the right-hand side arrow (abscissa of approximately 127°) are separation points.

In the charts of FIG. 4, the high portion reports an a posteriori check, to illustrate the effectiveness of the process according to the present invention. This represents the correlations of the respective combinations of the low portion of the figure with a seismic line test trace having a listening point situated at approximately 400 meters. For the identified separation points, the separation between signal and noise is evidenced: in fact, in the test correlations, at the angle of 52° a minimal peak can be observed of the noise distributed along the trace. At the angle of 126°, the signal correlation peak nearly totally disappears.

Example 2

The charts of FIG. 5 represent the separation between signal and noise obtained by correlating the independent combinations according to the check made in the charts of FIG. 4. By operating on the signals from the seismic line installed nearby the well, the horizontal abscissa ranging from the trace on the left-hand side, corresponds to the distance of 240 meters from the well, and the trace 54, on the right hand side, corresponds to the distance of 1300 meters. The left side portion indicates the noise, i.e., the combination carried out with an angle of 127°, and the right side portion indicates the drilling bit signal, i.e., the combination carried out with an angle of 52°.

Example 3

From the charts depicted in FIG. 6, the results reported are obtained when the pilot signal traces generated by the geophone sensor installed on the yard and those installed on the derrick are used.

The measurements were carried out while the drilling bit was drilling at the depth of −864 meters (as referred to the rotary table). The processing procedure is the same as disclosed and used in Example 1. In the charts of FIG. 6, the bottom portion represents the check of statistical independence carried out by using, in this case, the algorithm:

$$\frac{E[x^4y^4] - E[x^4]E[y^4]}{E[x^4y^4]}$$

A first point and a second point were identified at abscissa values of approximately 105° and 165°, respectively. The intersection points with the horizontal axis, evidenced by the arrows depicted at the bottom of the Figure, identify the independent combinations which separate the drilling bit signal from the noise. This was then checked from the correlations with a test trace obtained from a listening point in the seismic line at a distance of about 400 meters. These are represented in the top portion of the Figure.

Example 4

Figure 7:
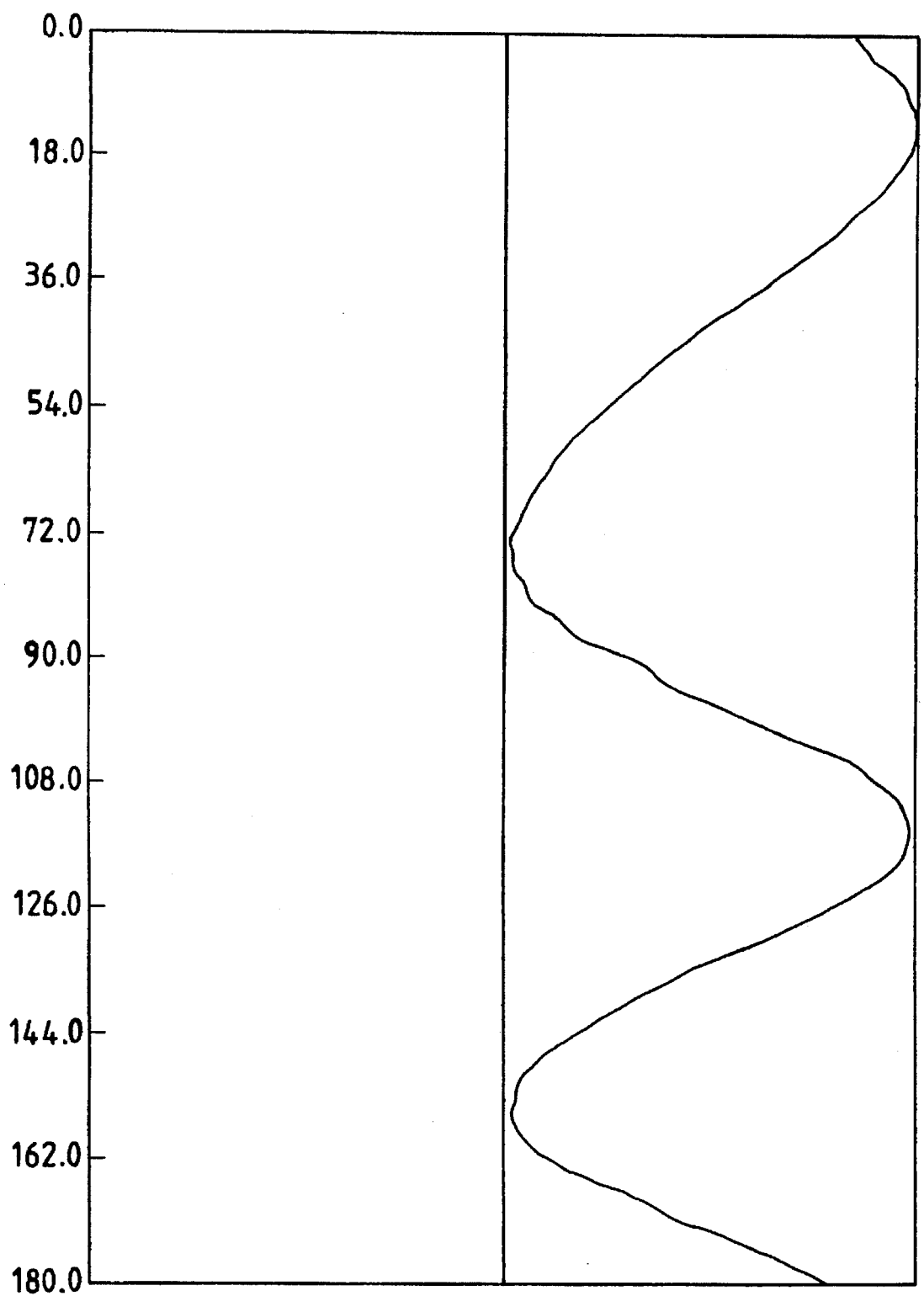

As pilot signals, the signals were taken from the ammeter and from the geophone installed on the drilling derrick. The measurements were carried out while the drilling bit was drilling at the depth of −1544 meters, by proceeding as follows:

1. the derrick signal was estimated from the ammeter signal by means of the expression (1);
2. both resulting signals are then combined analogously as disclosed in Example 1, to obtain perpendicular (x,y) combination pairs;
3. the statistical independence of the individual combinations was checked with the expression (3), using the algorithm of Example 3, as reported in FIG. 7;
4. the combinations which represent the separation result (abscissae at 73° and 156°) were then deconvoluted.

According to the charts of FIG. 8, such traces are correlated with the signals from the seismic line placed at a certain distance from the well (from 880 meters—trace 40 to 1300 meters—trace 61, as reported at the topside of FIG. 8).

In FIG. 8, the comparison is illustrated between the signal obtained from the pilot signal from the derrick, and after being deconvoluted (record A), and the reconstructed signals after the separation. A filter was applied to the data for removing the high noise frequencies introduced by the de-convolution and the lower frequencies. In record B, the noise with angle 73° is reported. In the record C, at the right-hand side, the signal with angle 156° is illustrated. The direct arrival of the signal appears in reconstructed form in the central portion of the record C, relatively to the corresponding portion of the record A, as one may remark by observing the Figure at the height of the side arrow.

We claim:

1. A process for determining seismic profiles of underground geologic formations by well bore drilling, wherein the vibrations of the drilling comprise a seismic source and having a plurality of receivers of various types arranged about the seismic source for receiving the vibrations and forming seismic lines with the seismic source, wherein the process comprises:

a) generating a signal by the drilling;
    b) receiving and analyzing said signal along the seismic lines by the plurality of receivers of various types and thereby receiving a plurality of signal traces, wherein said signal traces of each type of receiver have different characteristics; and
    c) processing said plurality of different received signal traces by transforming the frequency domain of said received signal traces, aligning said received signal traces in time, and filtering said received signal traces by multiplying, frequency by frequency, the spectra of the received signal traces according to the expression:

$$\hat{P}_j(w) = \frac{\overline{P_j^*(w)P_1(w)}}{[p_j(w)]^2 + e} P_j(w) \qquad j = 2, \ldots N$$

wherein, Pj(w) represents a signal trace; and wherein the values $\hat{P}_j(w)$ are combined thereby determining the seismic profile of an underground geologic formation.

2. The process of claim 1, wherein received the signal traces $P_1, P_2, \ldots P_n$, are treated as stochastic variables by applying coefficients thereto, thereby obtaining non-correlated combinations perpendicular to each other, and checking their statistical independence by decomposing the received signal traces into statistically independent events.

3. The process of claim 2 wherein each of said statistically independent events are separated into impulse events and uniform character events by using the fourth momentum divided by the square of the second momentum of the variable, thereby indicating the presence of isolated peaks, wherein each of said statistically independent events are separated by imposing maximalkurtosis or minimalkurtosis conditions thereby separating the received signal traces.

\* \* \* \* \*